(12) United States Patent
Wu et al.

(10) Patent No.: US 11,515,989 B2
(45) Date of Patent: Nov. 29, 2022

(54) BANDWIDTH SWITCHING METHOD AND USER EQUIPMENT

(71) Applicant: VIVO MOBILE COMMUNICATION CO., LTD., Guangdong (CN)

(72) Inventors: Yumin Wu, Guangdong (CN); Yanxia Zhang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 58 days.

(21) Appl. No.: 16/975,208

(22) PCT Filed: Feb. 2, 2019

(86) PCT No.: PCT/CN2019/074568
§ 371 (c)(1),
(2) Date: Aug. 24, 2020

(87) PCT Pub. No.: WO2019/161739
PCT Pub. Date: Aug. 29, 2019

(65) Prior Publication Data
US 2020/0412512 A1 Dec. 31, 2020

(30) Foreign Application Priority Data
Feb. 24, 2018 (CN) .......................... 201810165967.3

(51) Int. Cl.
*H04L 5/00* (2006.01)
*H04W 56/00* (2009.01)
(Continued)

(52) U.S. Cl.
CPC ....... *H04L 5/0096* (2013.01); *H04W 56/0045* (2013.01); *H04W 72/0453* (2013.01); *H04W 74/006* (2013.01)

(58) Field of Classification Search
CPC ..... H04L 5/001; H04L 5/0096; H04L 5/0098; H04L 5/0051; H04L 1/0041;
(Continued)

(56) References Cited

U.S. PATENT DOCUMENTS

2019/0132110 A1* 5/2019 Zhou ..................... H04L 5/0094
2019/0141546 A1* 5/2019 Zhou ................. H04W 72/0453
(Continued)

FOREIGN PATENT DOCUMENTS

CN      107690191 A      2/2018

OTHER PUBLICATIONS

First Office Action dated Sep. 28, 2020 issued in Chinese Application No. 201810165967.3.
(Continued)

*Primary Examiner* — Hassan A Phillips
*Assistant Examiner* — Hicham B Foud
(74) *Attorney, Agent, or Firm* — Brooks Kushman P.C.

(57) ABSTRACT

The embodiments of the disclosure provide a bandwidth switching method and a user equipment. The method includes: when a BWP switching command is received while successfully receiving the random access completion message of the non-contention-based random access process, determine the non-contention-based random access process has been completed successfully in accordance with random access completion message, and determine not to perform the BWP switching process, or perform the BWP switching process in accordance with the random access completion message and the BWP switching command.

15 Claims, 4 Drawing Sheets

(51) Int. Cl.
*H04W 72/04* (2009.01)
*H04W 74/00* (2009.01)

(58) Field of Classification Search
CPC ... H04L 1/0045; H04L 5/0032; H04L 5/0035; H04L 5/005; H04L 5/0055; H04L 5/0058; H04L 5/0092; H04W 56/004; H04W 56/0045; H04W 72/0453; H04W 74/006; H04W 74/0833; H04W 72/14; H04W 72/04; H04W 72/044; H04W 72/1268; H04W 72/1289; H04W 88/06; H04W 88/10
See application file for complete search history.

(56) References Cited

U.S. PATENT DOCUMENTS

| | | | | |
|---|---|---|---|---|
| 2019/0166555 A1* | 5/2019 | Cheng | ............... | H04B 7/0695 |
| 2019/0182870 A1* | 6/2019 | Shih | ................ | H04W 16/32 |
| 2019/0200396 A1* | 6/2019 | Agiwal | ............ | H04W 74/0833 |
| 2019/0207662 A1* | 7/2019 | Zhou | ................ | H04W 76/27 |
| 2020/0288502 A1* | 9/2020 | Lee | ................ | H04W 74/0833 |

OTHER PUBLICATIONS

3GPP TS 38.321 V15.0.0, 3rd Generation Partnership Project; Technical Specification Group Radio Access Network; NR; Medium Access Control (MAC) protocol specification (Release 15), 55 pages.

3GPP TSG-RAN2 NR Ad hoc 0118, R2-1800187, Vancouver, Canada, Jan. 22-Jan. 26, 2018, "Further considerations on RA and BWP", 4 pages.

3GPP TSG-RAN WG2 NR Ad hoc 1801, R2-1800961, Vancouver, Canada, Jan. 22-26, 2018, "Further details on BWP switch interaction with RA", 5 pages.

3GPP TSG-RAN2 #101, R2-1801815, Athens, Greece, 26" Feb.-Mar. 2, 2018, Revision of R2-1800187, "Further considerations on RACH related BWP issues", 6 pages.

3GPP TSG-RAN WG2 #101, Tdoc R2-1803203, Athens, Greece, Feb. 26-Mar. 2, 2018, "BWP selection and RA", 7 pages.

* cited by examiner

BANDWIDTH SWITCHING METHOD AND USER EQUIPMENT

CROSS-REFERENCE TO RELATED APPLICATION

The present application is the U.S. national phase of PCT Application No. PCT/CN2019/074568 filed on Feb. 2, 2019, which claims a priority of the Chinese patent application No. 201810165967.3 filed on Feb. 24, 2018, which are incorporated herein by reference in their entirety.

TECHNICAL FIELD

The present disclosure relates to the field of communications technology, in particular to a bandwidth switching method and a user equipment (User Equipment, UE).

BACKGROUND

Along with the development of mobile communications technology, more and more techniques have been introduced to improve the communication efficiency.

(1) Bandwidth Part (Bandwidth Part, BWP)

In a fifth-generation (Fifth-Generation, 5G) system, probably a UE only supports a relatively small working bandwidth (e.g., 5 MHz), but a cell at a network side may support a relatively large bandwidth (e.g., 100 MHz). The small bandwidth at which the UE operates in the large bandwidth is considered as a BWP. From the perspective of UE configuration, the BWP may be a BWP at a cell for different UE functions.

The network side may configure one or more BWPs for the UE, and a currently-activated BWP for the UE may be switched through a BWP switching command (e.g., Physical Downlink Control Channel (PDCCH) indication information), i.e., a new BWP is activated and the currently-activated BWP is deactivated.

In addition, the network side may configured a BWP-inactivity timer for an activated BWP. After one BWP has been activated, the BWP-inactivity timer is started by the UE, and after the BWP-inactivity timer expires, the activated-BWP is switched to a default BWP configured by the network side.

(2) Random Access Process

A random access process mainly includes a non-contention-based random access process and a contention-based random access process.

As shown in FIG. 1, the non-contention-based random access process mainly includes the following three steps.

Step 101: transmitting, by a base station, an Msg0 message to the UE.

To be specific, a dedicated random access resource for the non-contention-based random access process is allocated by the base station to the UE.

Step 102: transmitting, by the UE, an Msg1 message to the base station.

To be specific, a dedicated random access signal is transmitted by the UE to the base station on the designated random access resource in accordance with the random access resource indicated in the Msg0 message.

After the transmission of the Msg1 message, identification information about an Msg2 message scheduled by the network side (e.g., a random access radio network temporary identity (Random Access Radio Network Temporary Identity, RA-RNTI) is calculated by the UE in accordance with a transmission time and a frequency position of the Msg1 message through the following equation: RA-RNTI=1+t_id+10*f_id, where t_id represents a sub-frame identity of the random access signal, and f_id represents a frequency-domain identity of the random access signal.

After the transmission of the Msg1, a downlink channel is monitored by the UE within a fixed window (e.g., random access response window (Random Access Response window, RAR window)) to acquire feedback information from the network side, i.e., the Msg2 message. A start position of the RAR window is a sub-frame where the transmission of the Msg1 message is completed plus three sub-frames, and a length of the RAR window a length configured by the network side.

Step 103: transmitting, by the base station, the Msg2 message to the UE.

To be specific, a random access response (Random Access Response, RAR) is transmitted by the base station to the UE, and the RAR includes identification information about the Msg1 (e.g., a random access preamble identifier (Random Access Preamble Identifier, RAPID)), information about a timing advance (Timing Advance, TA)), uplink grant (Uplink Grant, UL Grant), a backoff indicator, and a temporary C-RNTI. When the UE fails to receive the RAR, it may determine a next time point for initiating the random access process in accordance with the backoff indicator in the RAR. Upon the receipt of the identification information about the Msg1 message in the Msg2 message, the UE may determine that the random access process is completed.

As shown in FIG. 2, the contention-based random access process mainly includes the following four steps.

Step 201: transmitting, by the UE, the Msg1 message to the base station.

To be specific, the UE selects a random access resource and transmits a selected random access signal to the base station using the random access resource. The calculation of the RA-RNTI and the RAR window is the same as that in the non-contention-based random access process.

Step 202: transmitting, by the base station, the Msg2 message to the UE.

To be specific, upon the receipt of the Msg1 message, the base station calculates the TA and transmits an RAR message to the UE. The RAR message at least includes the TA and the UL grant for an Msg3 message. The Msg2 message is received by the UE through a physical downlink control channel (Physical Downlink Control Channel, PDCCH) with the RA-RNTI.

Step 203: transmitting, by the UE, the Msg3 message to the base station.

To be specific, uplink transmission is performed by the UE on a UL grant designated in the Msg2 message, and contents in the uplink transmission in the Msg3 message are different for different random access causes. For example, for initial access, a radio resource control (Radio Resource Control, RRC) connection establishment request is transmitted through the Msg3 message.

Step 204: transmitting, by the base station, an Msg4 message to the UE.

The Msg4 message is a contention solution message, and the UE may determine whether the random access process is performed successfully in accordance with the Msg4 message.

(3) Multi-Beam

In a future 5G system, in order to achieve a downlink transmission rate of 20 Gbps and an uplink transmission rate of 10 Gbps, high-frequency communication and massive-antenna techniques will be introduced. Through the high-frequency, a larger system bandwidth and a smaller antenna size may be provided, so it is able to deploy massive antennae in the base station and the UE advantageously. The transmission and reception through multi-beam/multi-TRP will be widely used at a base station side, and the transmission and reception through multi-beam at a UE side will be widely used at a UE side. Taking a physical uplink shared channel (Physical Uplink Shared Channel, PUSCH) in new radio (New Radio, NR) as an example, the multi-beam uplink transmission is shown in FIG. 3. In FIG. 3, a communications system includes a UE 31, a TRP 32, a first PUSCH 33 and a second PUSCH 34.

An identification mode of the beam includes beam identity (Identity, ID), a synchronous signal block (Synchronous Signal Block, SSB) ID, and a channel state information reference signal (Channel State Information Reference Signal, CSI-RS) ID.

(4) Beam Failure Recovery Procedure

When a downlink beam failure occurs for the UE, a beam failure recovery request procedure is triggered by the UE.

For a non-contention-based beam recovery request, the non-contention-based random access process is triggered by the UE. The UE transmits a random access preamble in accordance with a configuration of the network side, and receive feedback information from the network side (e.g., a PDCCH scheduled by a cell radio network temporary identifier (Cell Radio Network Temporary Identifier, C-RNTI)) on a resource designated by the network side for beam failure recovery. Upon the receipt of the feedback information for the beam recovery request from the network side, the UE determines that a (serving) beam corresponding to the cell is recovered successfully.

For a contention-based beam recovery request, the contention-based random access process is triggered by the UE.

In the non-contention-based random access process, when the UE has successfully received the RAR message and the BWP switching command, there is an urgent need to provide a scheme for the UE to perform a BWP switching process.

SUMMARY

An object of the present disclosure is to provide a bandwidth switching method and a UE, so as to enable the UE to perform the BWP switching process when the BWP switching command is received by the UE while successfully receiving the RAR message.

In one aspect, the present disclosure provides in some embodiments a bandwidth switching method applied for a UE, including: when a BWP switching command is received while successfully receiving a random access completion message for a non-contention-based random access process, determining that the non-contention-based random access process has been completed successfully in accordance with the random access completion message; and determining that a BWP switching process is not to be performed, or performing the BWP switching process in accordance with the random access completion message and the BWP switching command.

In another aspect, the present disclosure provides in some embodiments a UE, including: a first determination module configured to, when a BWP switching command is received while successfully receiving a random access completion message for a non-contention-based random access process, determine that the non-contention-based random access process has been completed successfully in accordance with the random access completion message; a second determination module configured to determine that a BWP switching process is not to be performed; and an execution module configured to perform the BWP switching process in accordance with the random access completion message and the BWP switching command.

In yet another aspect, the present disclosure provides in some embodiments a UE, including a processor, a memory, and a computer program stored in the memory and executed by the processor. The processor is configured to execute the computer program so as to implement the above-mentioned bandwidth switching method.

In still yet another aspect, the present disclosure provides in some embodiments a computer-readable storage medium storing therein a computer program. The computer program is executed by a processor so as to implement the above-mentioned bandwidth switching method.

According to the embodiments of the present disclosure, in the non-contention-based random access process, when the UE has successfully received the RAR message and the BWP switching command, the UE may not perform the BWP switching process, or perform the BWP switching process in accordance with the random access completion message and the BWP switching command. As a result, it is able definitely determine a behavior at a UE side, and enable the behavior of the UE to be consistent with that at a network side (i.e., to enable an activated or deactivated BWP for the UE to be consistent with that configured by the network side), thereby to prevent the occurrence of data loss.

BRIEF DESCRIPTION OF THE DRAWINGS

Through reading the detailed description hereinafter, the other advantages and benefits will be apparent to a person skilled in the art. The drawings are merely used to show the preferred embodiments, but shall not be construed as limiting the present disclosure. In addition, in the drawings, same reference symbols represent same members. In these drawings.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Such words as "include" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" is merely used to describe the relationship between objects, and it may include three situations. For example, "A and/or B" may represent that, there is only A, there are both A and B, and there is only B.

Such expressions as "illustrative" and "for example" are merely used to show examples or explanations. Any illustrative embodiment or scheme in the present disclosure shall not be construed as being superior over the other embodiment or scheme. Definitely, these words intend to exhibit relevant concepts in a concrete manner.

Figure 1:
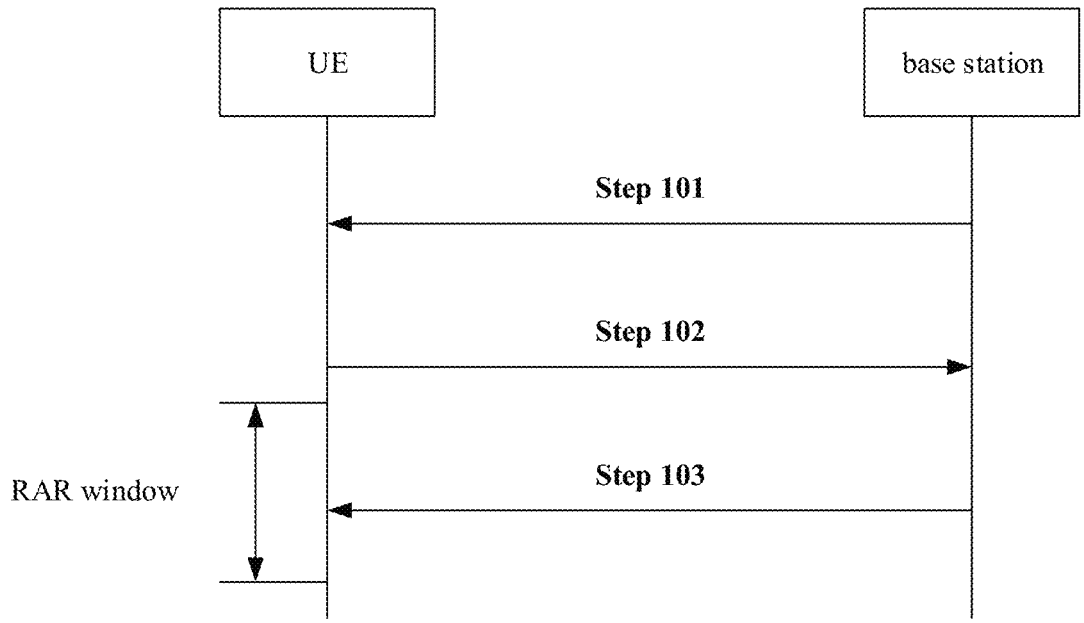
FIG. 1 is a schematic view showing a conventional non-contention-based random access process.
Figure 2:
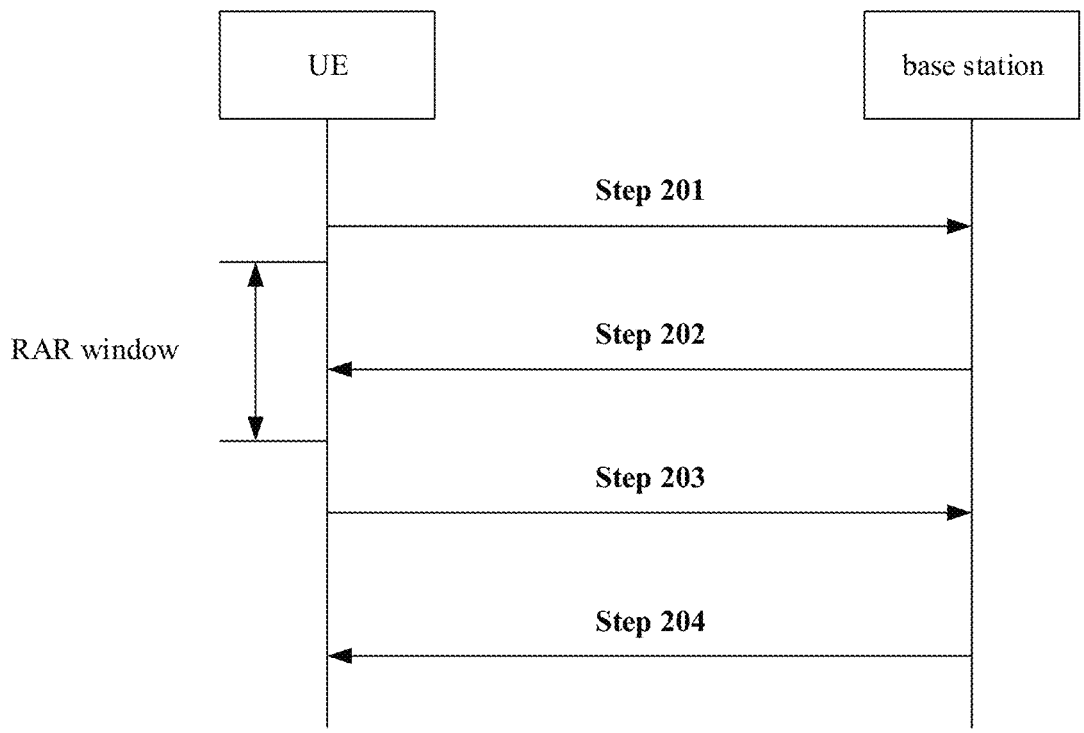
FIG. 2 is a schematic view showing a conventional contention-based random access process.
Figure 3:
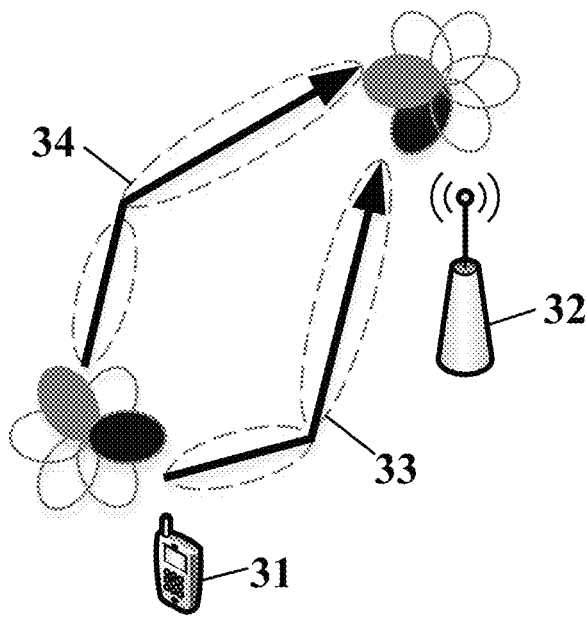
FIG. 3 is a schematic view showing uplink multi-beam transmission in the related art.
Figure 4:
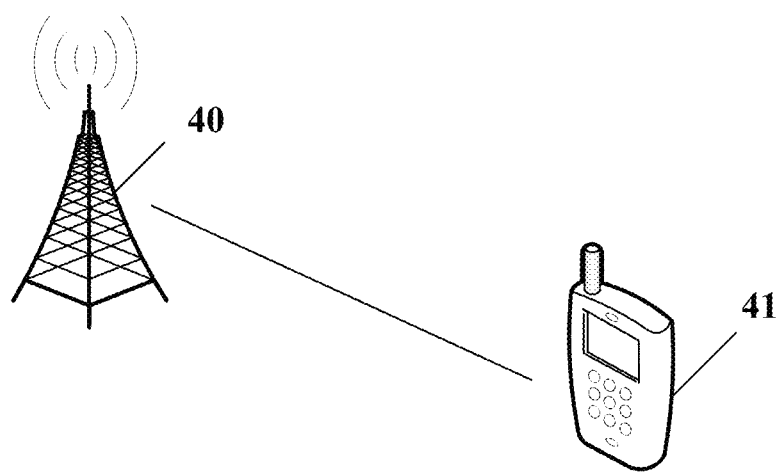
FIG. 4 is a schematic view showing architecture of a wireless communications system according to one embodiment of the present disclosure.

The present disclosure will be described hereinafter in conjunction with the drawings. A bandwidth switching method and a UE in the embodiments of the present disclosure may be applied to a wireless communications system. The wireless communications system may be a 5G system, an evolved long term evolution (Evolved Long Term Evolution, eLTE) system, or a subsequently evolved communications system. As shown in FIG. 4, which is a schematic view showing architecture of the wireless communications system, the wireless communications system may include a network side device 40 and a UE, e.g., UE 41, which may communicate with the network side device 40. In actual use, the devices may be connected to each other in a wireless manner. A solid line is adopted in FIG. 4 to intuitively show a connection relationship between the devices.

It should be appreciated that, the communications system may include a plurality of UEs, and the network side device may communicate with each of the UEs (transmit signaling or data).

The network side device in the embodiments of the present disclosure may be a base station. The network side device may be a commonly-used base station, an evolved node base station (eNB), or a network side device (e.g., a next generation node base station (gNB) or a transmission and reception point (Transmission And Reception Point, TRP) in the 5G system.

The UE in the embodiments of the present disclosure may be mobile phone, tablet computer, laptop computer, ultra-mobile personal computer (Ultra-Mobile Personal Computer, UMPC), netbook or personal digital assistant (Personal Digital Assistant, PDA).

Figure 5:
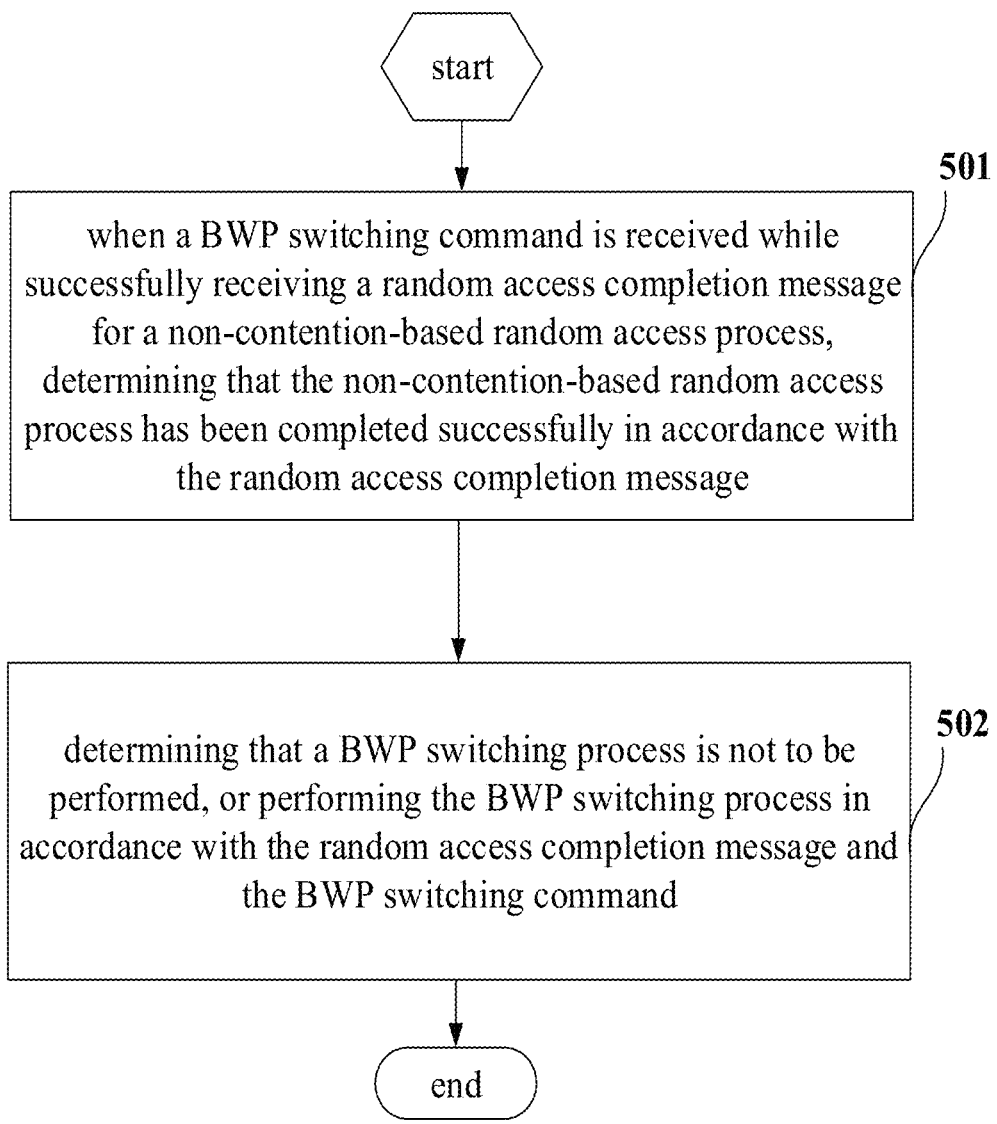
FIG. 5 is a flow chart of a bandwidth switching method according to one embodiment of the present disclosure.

As shown in FIG. 5, the present disclosure provides in some embodiments a bandwidth switching method applied for a UE, which includes the following steps.

Step 501: determining, when a BWP switching command is received while successfully receiving a random access completion message for a non-contention-based random access process, that the non-contention-based random access process has been completed successfully in accordance with the random access completion message.

In a possible embodiment of the present disclosure, when the non-contention-based random access process is triggered by a beam failure recovery request, the random access completion message may be a PDCCH, and the PDCCH may include a C-RNTI of the UE. Further, the random access completion message may be received on a resource for feeding back the beam failure recovery request.

In a possible embodiment of the present disclosure, when the non-contention-based random access process is not triggered by the beam failure recovery request, the random access completion message may be an RAR message, and the RAR message may indicate a random access request identifier.

Step 502: determining that a BWP switching process is not to be performed, or performing the BWP switching process in accordance with the random access completion message and the BWP switching command.

In a possible embodiment of the present disclosure, when the random access completion message includes a TA, in Step 502, the performing the BWP switching process in accordance with the random access completion message and the BWP switching command may include any one of: discarding the TA and performing the BWP switching process in accordance with the BWP switching command; after uplink timing adjustment has been completed in accordance with the TA, performing the BWP switching process in accordance with the BWP switching command; when the TA is indicated by a network side for a new BWP after BWP switching, performing the BWP switching process in accordance with the BWP switching command, and using the TA for the new BWP after the BWP switching; and when the TA is indicated by the network side that the TA is not for the new BWP after the BWP switching, discarding the TA and performing the BWP switching process in accordance with the BWP switching command.

In a possible embodiment of the present disclosure, when the random access completion message includes uplink grant, in Step 502, the performing the BWP switching process in accordance with the random access completion message and the BWP switching command may include any one of: discarding the uplink grant, and performing the BWP switching process in accordance with the BWP switching command; after data has been transmitted in accordance with the uplink grant, preforming the BWP switching process in accordance with the BWP switching command; when the uplink grant is indicated by the network side for a new BWP after the BWP switching, performing the BWP switching process in accordance with the BWP switching command, and using the uplink grant for the new BWP after the BWP switching; and when the uplink grant is indicated by the network side that the uplink grant is not for the new BWP after the BWP switching, discarding the uplink grant, and performing the BWP switching process in accordance with the BWP switching command.

In a possible embodiment of the present disclosure, subsequent to performing the BWP switching process in accordance with the random access completion message and the BWP switching command in Step 502, the bandwidth switching method may further include: starting an inactivity timer for a switched BWP, the switched BWP being activated in accordance with the BWP switching command; and/or switching a reference signal for radio link monitoring (Radio Link Monitoring, RLM) measurement for the switched BWP to a first reference signal, the first reference signal being a reference signal configured by the network side for the RLM measurement for the switched BWP.

In a possible embodiment of the present disclosure, when determining that the BWP switching process is not to be performed in Step 502, a UE behavior may include switching a second BWP to a first BWP (i.e., enabling the second BWP to fall back to the first BWP) when a physical random access channel (Physical Random Access Channel, PRACH) is transmitted by the UE and the first BWP has been switched to the second BWP, and the first BWP may be a BWP prior to the transmission of the PRACH.

According to the embodiments of the present disclosure, in the non-contention-based random access process, when the UE has successfully received the RAR message and the BWP switching command, the UE may not perform the BWP switching process, or perform the BWP switching process in accordance with the random access completion message and the BWP switching command. As a result, it is able definitely determine the behavior at a UE side, and enable the behavior of the UE to be consistent with that at the network side (i.e., to enable an activated or deactivated BWP for the UE to be consistent with that configured by the network side), thereby to prevent the occurrence of data loss.

Example 1: The BWP Switching for an Msg2 Message in a Random Access Process

In the embodiments of the present disclosure, for the non-contention-based random access process, when the BWP switching command is received while successfully receiving the random access completion message, the UE may determine that the non-contention-based random access process has been completed successfully, and the UE behavior may include one of not performing the BWP switching process and performing the BWP switching process.

In the embodiments of the present disclosure, when the TA is carried in the random access completion message, the UE behavior may include one of: (1) when the UE determines that the BWP switching process is to be performed, discarding the TA and performing the BWP switching process; (2) when the UE determines that the BWP switching process is to be performed, performing the BWP switching process after the uplink timing adjustment has been completed in accordance with the TA; (3) when the UE determines that the BWP switching process is to be performed and the TA is indicated by the network side for a new BWP after the BWP switching, preforming the BWP switching process and using the TA; and (4) when the UE determines that the BWP switching process is to be performed and the TA is indicated by the network side that the TA is not for a new BWP after the BWP switching, discarding the TA and performing the BWP switching process.

In the embodiments of the present disclosure, when the UL grant is carried in the random access completion message, the UE behavior may include one of: (1) when the UE determines that the BWP switching process is to be performed, discarding the UL grant; (2) when the UE determines that the BWP switching process is to be performed, performing the BWP switching process after the data has been transmitted in accordance with the UL grant; (3) when the UE determines that the BWP switching process is to be performed and the UL grant is indicated by the network side for a new BWP after the BWP switching, performing the BWP switching process and using the UL grant; and (4) when the UE determines that the BWP switching process is to be performed and the UL grant is indicated by the network side that the UL grant is not for a new BWP after the BWP switching, discarding the UL grant and performing the BWP switching process.

In the embodiments of the present disclosure, when the non-contention-based random access process is triggered by the beam failure recovery request, the random access completion message may be a PDCCH including a C-RNTI of the UE configured by the network side and received on the resource for feeding back the beam failure recovery request.

In the embodiments of the present disclosure, when the non-contention-based random access process is not triggered by the beam failure recovery request, the random access completion message may be an RAR message indicating a random access request identifier.

In addition, when the UE has performed the BWP switching process and has switched to a new activated BWP, a BWP-inactivity timer corresponding to the BWP switching may be started.

Example 2: The BWP Switching for an Msg1 Message in a Random Access Process

Step 1: when a UL BWP has been switched during the transmission of the PRACH and the UE has successfully received the random access completion message, the UE behavior may further include falling the UL BWP back to a UL BWP prior to the transmission of the PRACH.

Example 3: The Switching of a RLM Signal for an Activated BWP During the BWP Switching Step 1: when the UE has performed the BWP switching process, the UE behavior may further include switching a reference signal for Qin and Qout measurement in RLM for the switched (or activated) BWP to a reference signal configured by the network side for RLM measurement of the BWP.

The present disclosure further provides in some embodiments a UE. A principle of the UE for solving the problems is similar to that of the bandwidth switching method, so the implementation of the UE may refer to that of the bandwidth switching method, which will thus not be particularly defined herein.

Figure 6:
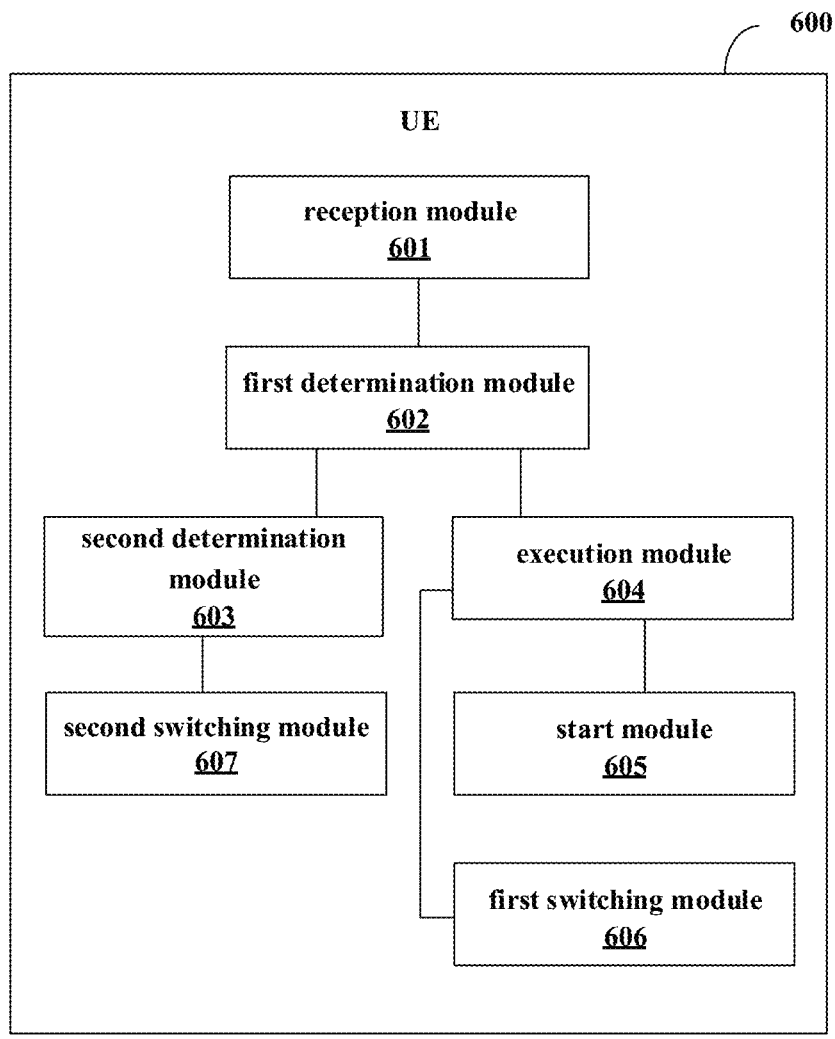
FIG. 6 is a schematic view showing a UE according to one embodiment of the present disclosure.

As shown in FIG. 6, the present disclosure provides in some embodiments a UE 600, which includes: a reception module 601 configured to receive a BWP switching command and a random access completion message for a non-contention-based random access process; a first determination module 602 configured to, when the BWP switching command is received while successfully receiving the random access completion message for the non-contention-based random access process, determine that the non-contention-based random access process has been completed successfully in accordance with the random access completion message; a second determination module 603 configured to determine that a BWP switching process is not to be performed; and an execution module 604 configured to perform the BWP switching process in accordance with the random access completion message and the BWP switching command.

In a possible embodiment of the present disclosure, the random access completion message may include a TA, and the execution module 604 is further configured to perform any one of: discarding the TA and performing the BWP switching process in accordance with the BWP switching command; after uplink timing adjustment has been completed in accordance with the TA, performing the BWP switching process in accordance with the BWP switching command; when the TA is indicated by a network side for a new BWP after BWP switching, performing the BWP switching process in accordance with the BWP switching command, and using the TA for the new BWP after the BWP switching; and when the TA is indicated by the network side that the TA is not for the new BWP after the BWP switching, discarding the TA and performing the BWP switching process in accordance with the BWP switching command.

In a possible embodiment of the present disclosure, the random access completion message may include an uplink grant, and the execution module 604 is further configured to perform any one of: discarding the uplink grant, and performing the BWP switching process in accordance with the BWP switching command; after data has been transmitted in accordance with the uplink grant, preforming the BWP switching process in accordance with the BWP switching command; when the uplink grant is indicated by the network side for a new BWP after the BWP switching, performing the BWP switching process in accordance with the BWP switching command, and using the uplink grant for the new BWP after the BWP switching; and when the uplink grant is indicated by the network side that the uplink grant is not for the new BWP after the BWP switching, discarding the uplink grant, and performing the BWP switching process in accordance with the BWP switching command.

In a possible embodiment of the present disclosure, the UE may further include a start module 605 and/or a first switching module 606. The start module 605 is configured to start an inactivity timer for a switched BWP, the first switching module 606 is configured to switch a reference signal for RLM measurement of the switched BWP to a first reference signal, and the first reference signal may be a reference signal configured by the network side for the RLM measurement of the switched BWP.

In a possible embodiment of the present disclosure, when the non-contention-based random access process is triggered by a beam failure recovery request, the random access completion message may be carried by a PDCCH and may include a C-RNTI of the UE; or when the non-contention-based random access process is not triggered by the beam failure recovery request, the random access completion message may be an RAR, the RAR indicates a random access request identifier.

In a possible embodiment of the present disclosure, the reception module 601 is further configured to receive the random access completion message on a resource for feeding back the beam failure recovery request.

In a possible embodiment of the present disclosure, the UE 600 may further include a second switching module 607 configured to switch a second BWP to a first BWP when a PRACH is transmitted by the UE and the first BWP has been switched to the second BWP, and the first BWP may be a BWP prior to the transmission of the PRACH.

The implementation principle and technical effect of the UE may refer to those of the method mentioned hereinabove, and thus will not be particularly defined herein.

Figure 7:
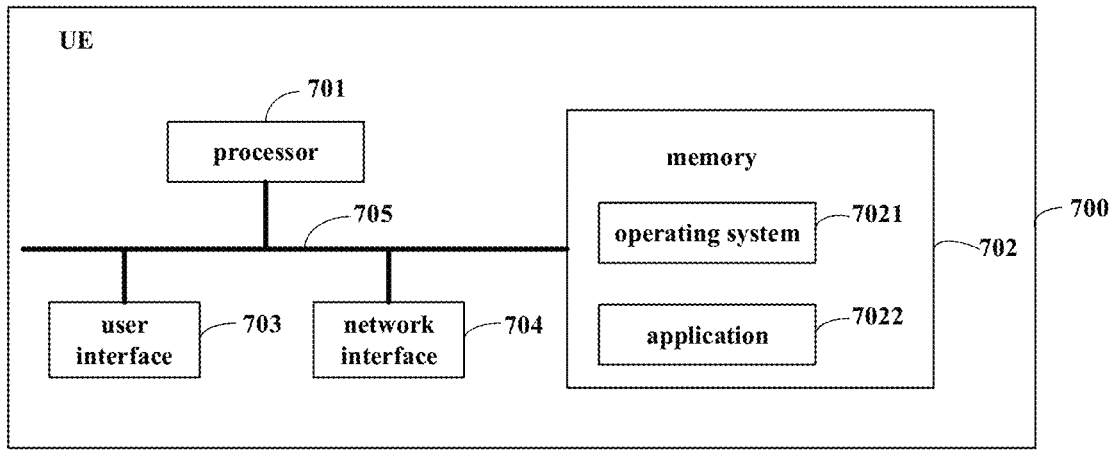
FIG. 7 is another schematic view showing the UE according to one embodiment of the present disclosure.

As shown in FIG. 7, the present disclosure further provides in some embodiments a UE 700, which includes at least one processor 701, a memory 702, at least one network interface 704 and a user interface 703. The components of the UE 700 may be coupled together through a bus system 705. It should be appreciated that, the bus system 705 is configured to achieve connection and communication among the components. Apart from a data bus, the bus system 705 may further include a power source bus, a control bus and a state signal bus. For clarification, all these buses in FIG. 7 may be collectively called as bus system 705.

The user interface 703 may include a display, a keyboard or a pointing device (e.g., mouse, track ball, touch plate or touch panel).

It should be appreciated that, the memory 702 may be a volatile memory, a nonvolatile memory or both. The nonvolatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM) which serves as an external high-speed cache. Illustratively but nonrestrictively, the RAM may include static RAM (Static RAM, SRAM), dynamic RAM (Dynamic RAM, DRAM), synchronous DRAM (Synchronous DRAM, SDRAM), double data rate SDRAM (Double Data Rate SDRAM, DDRSDRAM), enhanced SDRAM (Enhanced SDRAM, ESDRAM), synchronous link DRAM (Synchronous Link DRAM, SLDRAM) or direct Rambus RAM (Direct Rambus RAM, DRRAM). The memory 702 intends to include, but not limited to, the above-mentioned and any other appropriate memories.

In some embodiments of the present disclosure, the following elements may be stored in the memory 702: an executable module or data structure, a subset or an extended set thereof, an operating system 7021 and an application 7022.

The operating system 7021 may include various system programs, e.g., a framework layer, a core layer and a driving layer, so as to implement various basic services and process hardware-based tasks. The application 7022 may include various applications, e.g., Media Player and Browser, so as to implement various application services. The programs for implementing the above-mentioned method may be included in the application 7022.

In the embodiments of the present disclosure, through calling a program or instruction stored in the memory 702, e.g., a program or instruction stored in the application 7022, the processor 701 is configured to: when a BWP switching command is received while successfully receiving a random access completion message for a non-contention-based random access process, determine that the non-contention-based random access process has been completed successfully in accordance with the random access completion message; determine that a BWP switching process is not to be performed; or perform the BWP switching process in accordance with the random access completion message and the BWP switching command.

The implementation principle and technical effect of the UE may refer to those of the method mentioned hereinabove, and thus will not be particularly defined herein.

The steps of the methods or algorithm described in conjunction with the contents mentioned hereinabove may be implemented through hardware, or implemented by a processor executing instructions. The instructions may consist of corresponding modules stored in an RAM, a flash memory, an ROM, an EPROM, an EEPROM, a register, a hard disk, a mobile hard disk, a read-only optic disk, or any other known storage medium. Illustratively, the storage medium may be coupled to the processor, so that the processor is capable of reading information from the storage medium and writing information into the storage medium. Of course, the storage medium may be a component of the processor. The processor and the storage medium may be located in an application specific integrated circuit (Application Specific Integrated Circuit, ASIC). In addition, the ASIC may be located in an interface device of a core network. Of course, the processor and the storage medium may be located in the interface device of the core network as discrete assemblies.

It should be appreciated that, the functions described in one or more embodiments of the present disclosure may be achieved through hardware, software, firmware or a combination thereof. When the functions are achieved through software, these functions may be stored in the computer-readable medium or transmitted as one or more instructions or codes on the computer-readable medium. The computer-readable medium may include a computer-readable storage medium and a communication medium. The communication medium may include any medium capable of transmitting a computer program from one place to another place. The storage medium may include any available medium capable of being accessed by a general-purpose or dedicated computer.

The objects, the technical solutions and the beneficial effects of the present disclosure have been described hereinabove in details. It should be appreciated that, the above description may be for illustrative purposes only, but shall not be used to limit the scope of the present disclosure. Any modifications, equivalents or improvements shall also fall within the scope of the present disclosure.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, compact disc-read only memory (Compact Disc-Read Only Memory, CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A bandwidth switching method applied for a user equipment (UE), comprising:
    determining, when a bandwidth part (BWP) switching command is received while successfully receiving a random access completion message for a non-contention-based random access process, that the non-contention-based random access process has been completed successfully in accordance with the random access completion message; and
    determining that a BWP switching process is not to be performed in accordance with the random access completion message and the BWP switching command, or performing the BWP switching process in accordance with the random access completion message and the BWP switching command;
    wherein, the random access completion message comprises a timing advance, and the performing the BWP switching process in accordance with the random access completion message and the BWP switching command comprises any one of:
    discarding the timing advance and performing the BWP switching process in accordance with the BWP switching command;
    after uplink timing adjustment has been completed in accordance with the timing advance, performing the BWP switching process in accordance with the BWP switching command;
    when the timing advance is indicated by a network side for a new BWP after BWP switching, performing the BWP switching process in accordance with the BWP switching command, and using the timing advance for the new BWP after the BWP switching; and
    when the timing advance is indicated by the network side that the timing advance is not for the new BWP after the BWP switching, discarding the timing advance and performing the BWP switching process in accordance with the BWP switching command.

2. The bandwidth switching method according to claim 1, wherein subsequent to performing the BWP switching process in accordance with the random access completion message and the BWP switching command, the bandwidth switching method further comprises:
    starting an inactivity timer for a switched BWP; or
    switching a reference signal for radio link monitoring (RLM) measurement of the switched BWP to a first reference signal, the first reference signal being a reference signal configured by the network side for the RLM measurement of the switched BWP.

3. The bandwidth switching method according to claim 1, wherein
    when the non-contention-based random access process is triggered by a beam failure recovery request, the random access completion message is carried by a PDCCH and comprises a cell radio network temporary identifier (C-RNTI) of the UE; or
    when the non-contention-based random access process is not triggered by the beam failure recovery request, the random access completion message is a random access response (RAR) message, the RAR message indicates a random access request identifier.

4. The bandwidth switching method according to claim 3, wherein the receiving the random access completion message comprising receiving the random access completion message on a resource for feeding back the beam failure recovery request.

5. The bandwidth switching method according to claim 1, wherein, the bandwidth switching method further comprises if determining that the BWP switching process is not to be performed, when a first BWP has been switched to a second BWP during the transmission of the PRACH, switching the second BWP to the first BWP, and the first BWP is a BWP prior to the transmission of the PRACH.

6. A user equipment (UE), comprising a processor, a memory, and a computer program stored in the memory and executed by the processor, wherein the processor is configured to execute the computer program so as to implement the following steps:
   determining, when a bandwidth part (BWP) switching command is received while successfully receiving a random access completion message for a non-contention-based random access process, that the non-contention-based random access process has been completed successfully in accordance with the random access completion message; and
   determining that a BWP switching process is not to be performed in accordance with the random access completion message and the BWP switching command, or performing the BWP switching process in accordance with the random access completion message and the BWP switching command;
   wherein, the random access completion message comprises a timing advance, and the performing the BWP switching process in accordance with the random access completion message and the BWP switching command comprises any one of:
   discarding the timing advance and performing the BWP switching process in accordance with the BWP switching command;
   after uplink timing adjustment has been completed in accordance with the timing advance, performing the BWP switching process in accordance with the BWP switching command;
   when the timing advance is indicated by a network side for a new BWP after BWP switching, performing the BWP switching process in accordance with the BWP switching command, and using the timing advance for the new BWP after the BWP switching; and
   when the timing advance is indicated by the network side that the timing advance is not for the new BWP after the BWP switching, discarding the timing advance and performing the BWP switching process in accordance with the BWP switching command.

7. The UE according to claim 6, wherein subsequent to performing the BWP switching process in accordance with the random access completion message and the BWP switching command, the processor is further configured to execute the computer program so as to implement the following steps:
   starting an inactivity timer for a switched BWP; or
   switching a reference signal for radio link monitoring (RLM) measurement of the switched BWP to a first reference signal, the first reference signal being a reference signal configured by the network side for the RLM measurement of the switched BWP.

8. The UE according to claim 6, wherein
   when the non-contention-based random access process is triggered by a beam failure recovery request, the random access completion message is carried by a PDCCH and comprises a cell radio network temporary identifier (C-RNTI) of the UE; or
   when the non-contention-based random access process is not triggered by the beam failure recovery request, the random access completion message is a random access response (RAR) message, the RAR message indicates a random access request identifier.

9. The UE according to claim 8, wherein the receiving the random access completion message comprising receiving the random access completion message on a resource for feeding back the beam failure recovery request.

10. The UE according to claim 6, wherein, the processor is further configured to execute the computer program so as to implement the following steps: if determining that the BWP switching process is not to be performed, when a first BWP has been switched to a second BWP during the transmission of the PRACH, switching the second BWP to the first BWP, and the first BWP is a BWP prior to the transmission of the PRACH.

11. A non-transitory computer-readable storage medium, wherein the computer-readable storage medium stores a computer program, and when the computer program is executed by a processor, the following steps are implemented:
   determining, when a bandwidth part (BWP) switching command is received while successfully receiving a random access completion message for a non-contention-based random access process, that the non-contention-based random access process has been completed successfully in accordance with the random access completion message; and
   determining that a BWP switching process is not to be performed in accordance with the random access completion message and the BWP switching command, or performing the BWP switching process in accordance with the random access completion message and the BWP switching command;
   wherein, the random access completion message comprises a timing advance, and the performing the BWP switching process in accordance with the random access completion message and the BWP switching command comprises any one of:
   discarding the timing advance and performing the BWP switching process in accordance with the BWP switching command;
   after uplink timing adjustment has been completed in accordance with the timing advance, performing the BWP switching process in accordance with the BWP switching command;
   when the timing advance is indicated by a network side for a new BWP after BWP switching, performing the BWP switching process in accordance with the BWP switching command, and using the timing advance for the new BWP after the BWP switching; and
   when the timing advance is indicated by the network side that the timing advance is not for the new BWP after the BWP switching, discarding the timing advance and performing the BWP switching process in accordance with the BWP switching command.

12. The non-transitory computer-readable storage medium according to claim 11, wherein subsequent to performing the BWP switching process in accordance with the random access completion message and the BWP switching command, when the computer program is executed by a processor, the following steps are further implemented:
   starting an inactivity timer for a switched BWP; or
   switching a reference signal for radio link monitoring (RLM) measurement of the switched BWP to a first reference signal, the first reference signal being a reference signal configured by the network side for the RLM measurement of the switched BWP.

13. The non-transitory computer-readable storage medium according to claim 11, wherein
when the non-contention-based random access process is triggered by a beam failure recovery request, the random access completion message is carried by a PDCCH and comprises a cell radio network temporary identifier (C-RNTI) of the UE; or
when the non-contention-based random access process is not triggered by the beam failure recovery request, the random access completion message is a random access response (RAR) message, the RAR message indicates a random access request identifier.

14. The non-transitory computer-readable storage medium according to claim 13, wherein the receiving the random access completion message comprising receiving the random access completion message on a resource for feeding back the beam failure recovery request.

15. The non-transitory computer-readable storage medium according to claim 11, wherein, when the computer program is executed by a processor, the following steps are further implemented:
if determining that the BWP switching process is not to be performed, when a first BWP has been switched to a second BWP during the transmission of the PRACH, switching the second BWP to the first BWP, and the first BWP is a BWP prior to the transmission of the PRACH.

* * * * *